(12) United States Patent
Richter (10) Patent No.: US 10,899,062 B2
(45) Date of Patent: Jan. 26, 2021

(54) PROCESS AND APPARATUS FOR THE MANUFACTURE OF LARGE VOLUME CONTAINERS WITH FLANGE BY PLASTIC BLOW MOLDING

(71) Applicant: Bodo Richter, Bad Honnef (DE)

(72) Inventor: Gunter Richter, Altenkirchen (DE)

(73) Assignee: Bodo Richter, Bad Honnef (DE)

( * ) Notice: Subject to any disclaimer, the term of this patent is extended or adjusted under 35 U.S.C. 154(b) by 246 days.

(21) Appl. No.: 15/564,815

(22) PCT Filed: Apr. 29, 2016

(86) PCT No.: PCT/EP2016/059606
§ 371 (c)(1),
(2) Date: Oct. 6, 2017

(87) PCT Pub. No.: WO2016/177638
PCT Pub. Date: Nov. 10, 2016

(65) Prior Publication Data
US 2018/0117824 A1 May 3, 2018

(30) Foreign Application Priority Data

May 5, 2015 (DE) .................. 10 2015 106 960

(51) Int. Cl.
*B29C 49/02* (2006.01)
*B29C 49/04* (2006.01)
(Continued)

(52) U.S. Cl.
CPC .......... *B29C 49/04* (2013.01); *B29C 48/0017* (2019.02); *B29C 48/0022* (2019.02); *B29C 48/09* (2019.02); *B29C 48/142* (2019.02); *B29C 49/02* (2013.01); *B29C 49/22* (2013.01); *B29C 49/4247* (2013.01); *B29C 49/4278* (2013.01); *B29K 2023/0675* (2013.01); *B29K 2101/12* (2013.01); *B29K 2105/04* (2013.01); *B29L 2022/00* (2013.01); *B29L 2031/7126* (2013.01)

(58) Field of Classification Search
CPC ..... B29C 49/20; B29C 49/42; B29C 49/4247; B29C 49/4278; B29C 47/0054; B29C 51/267
See application file for complete search history.

(56) References Cited

U.S. PATENT DOCUMENTS 4,911,878 A * 3/1990 Hopperdietzel ........ B29C 49/20
264/515
5,087,504 A * 2/1992 Kanai .................. B29C 45/1657
285/336

(Continued)

FOREIGN PATENT DOCUMENTS

CN 102802914 A 11/2012
CN 103052479 A 4/2013
(Continued)

*Primary Examiner* — Matthew J Daniels
*Assistant Examiner* — Shibin Liang
(74) *Attorney, Agent, or Firm* — Young Basile Hanlon & MacFarlane, P.C.

(57) ABSTRACT

The invention relates to a method and a device for producing large-volume container trays of plastic. A tubular preform is guided over a mold frame which is facing two blow molds. During the closure of the blow molds, an encircling flange is formed on the outer edge of the container trays. After blow molding, the container trays are cut free from the mold frame along said mold frame.

2 Claims, 11 Drawing Sheets (51) Int. Cl.
  *B29C 48/09* (2019.01)
  *B29C 48/00* (2019.01)
  *B29C 49/22* (2006.01)
  *B29C 49/42* (2006.01)
  *B29C 48/14* (2019.01)
  *B29L 31/00* (2006.01)
  *B29K 23/00* (2006.01)
  *B29L 22/00* (2006.01)
  *B29K 101/12* (2006.01)
  *B29K 105/04* (2006.01)

(56) References Cited

U.S. PATENT DOCUMENTS

| | | | |
|---|---|---|---|
| 6,340,186 B2* | 1/2002 | Johnson | B60R 9/00 293/102 |
| 6,875,484 B1 | 4/2005 | Kogure et al. | |
| 9,511,530 B2* | 12/2016 | Vanmarcke | B29C 49/20 |
| 2009/0269530 A1* | 10/2009 | Schmidt | B32B 3/08 428/36.7 |

FOREIGN PATENT DOCUMENTS

| | | |
|---|---|---|
| DE | 60023409 T2 | 7/2006 |
| DE | 202010000953 U1 | 5/2011 |
| DE | 102010004586 A1 | 7/2011 |
| DE | 102012001928 A1 | 8/2013 |
| DE | 102013102325 A1 | 9/2014 |
| WO | 2010151724 A2 | 12/2010 |
| WO | 2012003896 A1 | 1/2012 |
| WO | 2013113558 A1 | 8/2013 |

\* cited by examiner

PROCESS AND APPARATUS FOR THE MANUFACTURE OF LARGE VOLUME CONTAINERS WITH FLANGE BY PLASTIC BLOW MOLDING

CROSS-REFERENCE TO RELATED APPLICATION(S)

This application is a national stage of International Application No. PCT/EP2016/059606, filed on Apr. 29, 2016, which claims priority to German Patent Application No. 10 2015 106 960.1, filed on May 5, 2015, the contents of all of which are hereby incorporated by reference in their entireties.

TECHNICAL FIELD

The invention relates to a method for producing large-volume container shells from plastic material, in which a tube-shaped preform or parison of plastic material in a thermoplastic state is fed to at least one blow mold in the open state. Further, the invention relates to a device for producing such large-volume container shells from plastic material.

BACKGROUND

Large-volume containers in closed form with a capacity of up to 10 000 liters serve as drinking water tanks, waste water tanks, fecal matter containers, rain receiving tanks, fire-fighting reservoirs and much more. Such closed containers are typically produced by blow molding. In particular, in the case of large-volume containers high transport and handling costs are incurred.

From DE 10 2010 004 586 A1 of the same applicant, a device and a method for producing large-volume hollow bodies from plastic material are known. A vacuum chamber completely surrounding a blow mold and a preform is sealed in an airtight manner. The preform includes a plastic foam layer which foams under vacuum.

From DE 10 2013 102 325 A1, furthermore a method and a device for producing large-surface hollow bodies from thermoplastic material are known, wherein preforms arranged next to each other are simultaneously blown in one blow mold separately from each other. At least two extrusion heads are spaced from each other and simultaneously extrude the preforms.

It is the object of the invention to produce large-volume container shells in an economical manner and to reduce transport and handling costs.

This object is solved for a method by the feature combination according to claim 1. Advantageous embodiments are specified in the dependent claims.

SUMMARY

According to the invention, a tube-shaped preform or parison of plastic material in a thermoplastic state is provided by a blow molding machine. This still formable preform is passed over a mold frame which faces at least one blow mold in the open state. When closing the blow mold, the mold frame forms a circumferential flange in interaction with the edge of the blow mold and thus at the outer edge of the container shell. After forming the container shell in the blow mold, the container shell is cut free from the mold frame along this mold frame. In this way, a large-volume open half-shell plastic container is produced, which presents a flat flange along its edge. Several such or similar open container shells can be transported to the point of destination while being stacked in one another. Two container shells with mating flanges are connected to each other along the two flanges, for example are screwed to each other with the aid of a seal, and thus form a large-volume closed container at the point of destination. Preferably, the flange provides a circumferential plane-parallel connecting surface with a sufficient flange thickness so that a stable connection can be established between two flanges. In one single transport, several container shells can be transported from the site of production to a sometimes quite remote point of destination so that transport costs are reduced. Due to the existing flanges, the handling for finishing the large-volume closed container at the point of destination is simple, as a result whereof corresponding costs remain low.

By using blow molding, the container shells and thus the closed container can be produced economically and cost-efficiently. Other production methods, such as thermoforming (deep drawing), cannot be considered for cost reasons and the lacking possibility of producing a flange. Also rotational sintering is not expedient from an economic perspective, since a processing of high-molecular materials, such as polyethylene, is not possible, and the output performance is low due to long cooling times. Injection molding, too, is not competitive since the very high tool costs and the required size of corresponding injection molding machines are not available technically and economically.

In the afore-described method, it is possible to produce only one single half-shell of the container, wherein after cutting the shell free from the mold frame a large remainder of plastic material remains, which is economically suboptimal. Therefore, according to an embodiment of the method, a further blow mold is used which is opposite to the mentioned blow mold. Here, the mold frame is arranged between the two blow molds and the tube-shaped preform or parison is passed over this mold frame. During blow molding, in both blow molds one half-shell container part is formed at the same time. Afterwards, the two open container shells are cut free from the mold frame along this mold frame. In this embodiment, thus the blow molding machine is efficiently used with two blow molds and the produced container half-shells and their flanges are aligned with one another in an exactly matching manner so that they form a large-volume closed container in a best possible manner when they are connected at the point of destination.

It is advantageous when the mold frame is made up of several retractable and extendable mold elements so that, as viewed in transverse direction of the tube of the preform, when putting on the preform the mold frame has a smaller dimensional size than the inner diameter of the preform. During plastic blow molding the mold frame then assumes an extended spread-out state in which the outer edge of the mold frame extends at least up to the outer edge of the respective blow mold to form the circumferential flange in interaction with this edge. In this way, the tube-shaped preform ejected from a molten material head of the blow molding machine and having a relatively small tube diameter can be passed over the mold frame without any problems and enclose this mold frame. By blowing compressed air into it and by spreading the mold frame, the preform is likewise correspondingly expanded so that in the case of closed blow molds the flange is formed between the edge of the blow mold and the mold frame, and the preform is pressed into the respective blow mold. After cooling down in the respective blow mold, the container shell is removed after it has been cut free from the mold frame.

Further, it is advantageous when, during the formation of the flange, screw holes and/or a circumferential groove for receiving a sealing element are formed as well. In doing so, it is made easier to connect two container half-shells to one another at the point of destination in order to form a large-volume container which is closed in a fluid-tight manner.

According to a further aspect of the invention, a device for producing large-volume container shells from plastic material is specified. The technical advantages which can be achieved by means of this device substantially correspond to those which are achievable by means of the afore-described method.

BRIEF DESCRIPTION OF THE DRAWINGS

Embodiments of the invention are explained in the following on the basis of the drawings.

DETAILED DESCRIPTION

Figure 1:
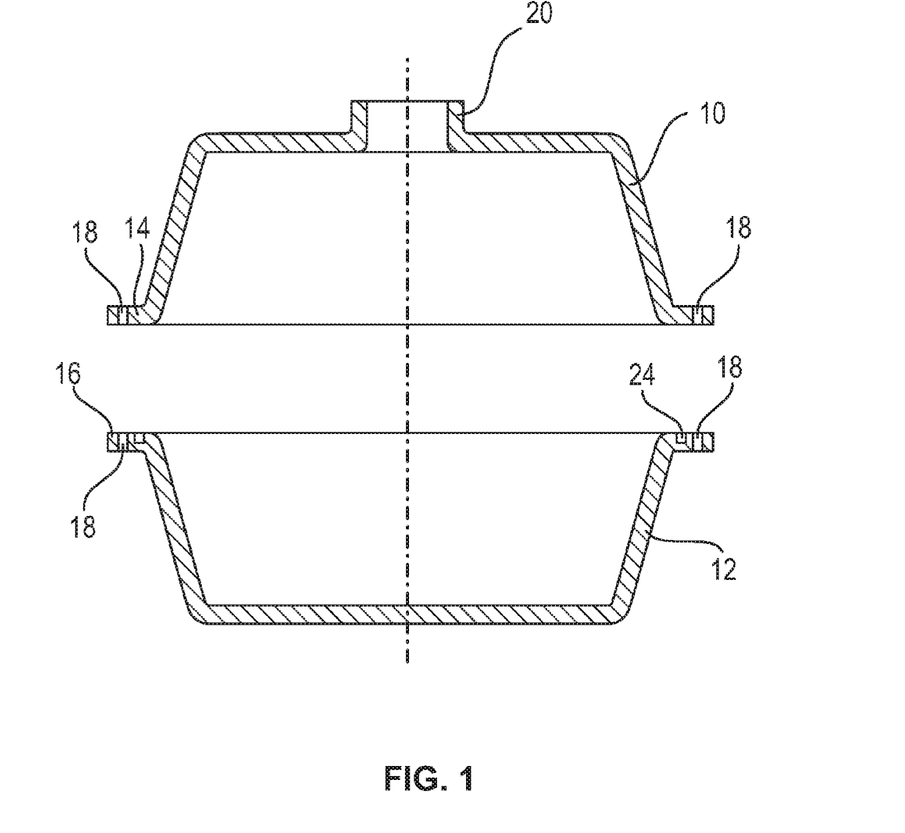
FIG. 1 shows a cross-section of open container shells with a respective circumferential flange.

FIG. 1 shows in a cross-section the open container shells 10, 12 produced in a blow molding machine, each of which with a circumferential flange 14, 16. Through holes 18 are formed in the respective flange 14, 16 and a circumferential groove 24 is formed in the flange 16. The container shells 10, 12 are transported from the place of production to the point of destination in the open state and, thereat, are connected to one another along the flanges 14, 16 in a fluid-tight manner by means of a screw connection. The large-volume closed container formed in this way serves at the point of destination as a drinking water tank, waste water tank, fecal matter container, rain receiving tank, fire-fighting reservoir etc. In the upper container shell 10, an access opening 20 is formed.

Figure 2:
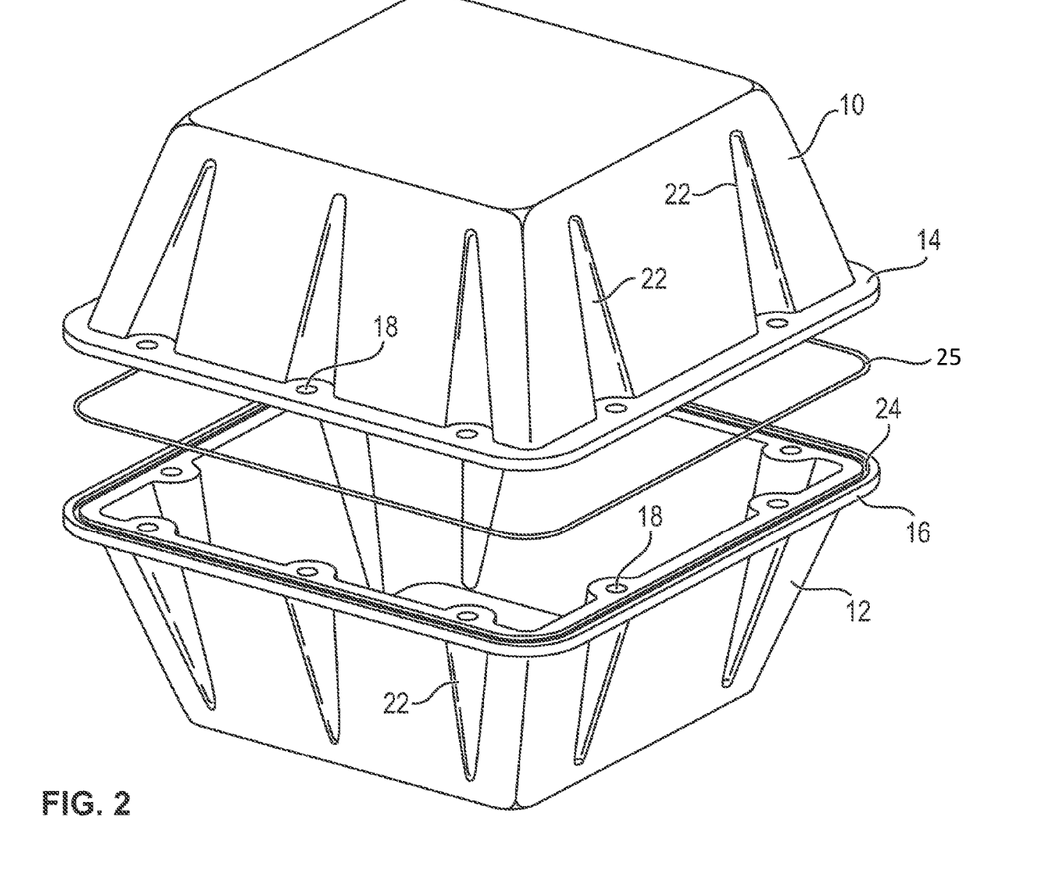
FIG. 2 shows a perspective view of container shells.

FIG. 2 shows a perspective view of the container shells 10, 12, each of which having reinforcing elements 22. The flange 16 includes the circumferential groove 24 into which a sealing element 25 for the fluid-tight connection of the flanges 14, 16 is inserted.

Figure 3:
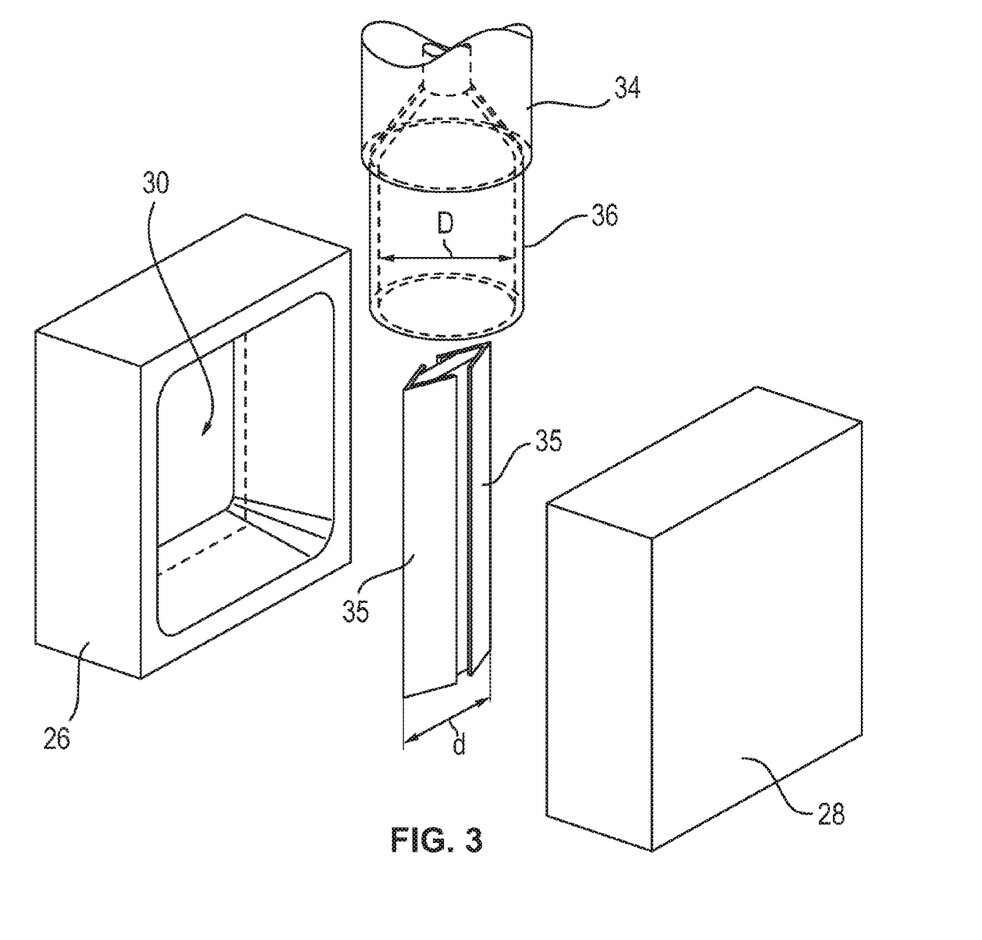
FIG. 3 schematically shows the arrangement of two blow molds with a mold frame arranged therebetween.

FIG. 3 schematically shows the arrangement of two blow molds 26, 28 with a respective corresponding cavity 30 for forming the container shells 10, 12. Here, the blow molds 26, 28 are shown in the open state spaced from each other and a mold frame 32 is arranged between them. From a molten material head 34 of the blow molding machine a tube-shaped preform 36 is ejected in a still thermoplastic state. Preferably, high-molecular polyethylene is used as a plastic material. Its inner diameter D is larger than the width d of the entire mold frame 32 in its retracted state so that the preform 36 can be freely passed downward over the mold frame 32 and thus fully surrounds the mold frame 32. The mold frame 32 comprises mold elements 35 extendable and retractable in transverse direction.

Figure 4:
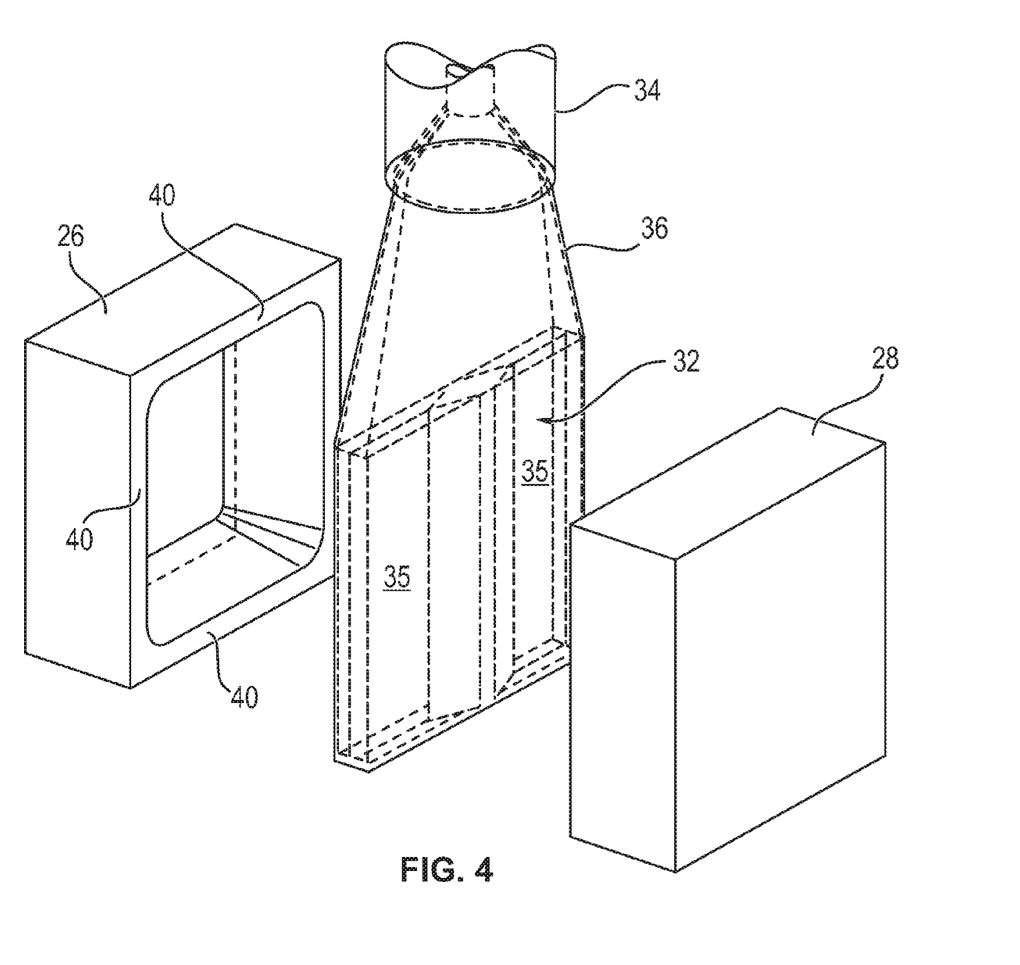
FIG. 4 shows an illustration with spread-out mold frame.

In FIG. 4, the preform 36 is passed downward so far that its lower end at least extends up to the lower dimension of the facing blow molds 26, 28. The mold frame 32 is laterally extended with its mold elements 35 and in doing so spreads the preform 36 surrounding it. In this extended state of the mold frame 32, external portions of the mold elements 35 face frame portions 40 of the blow molds 26, 28 on all four sides.

Figure 5:
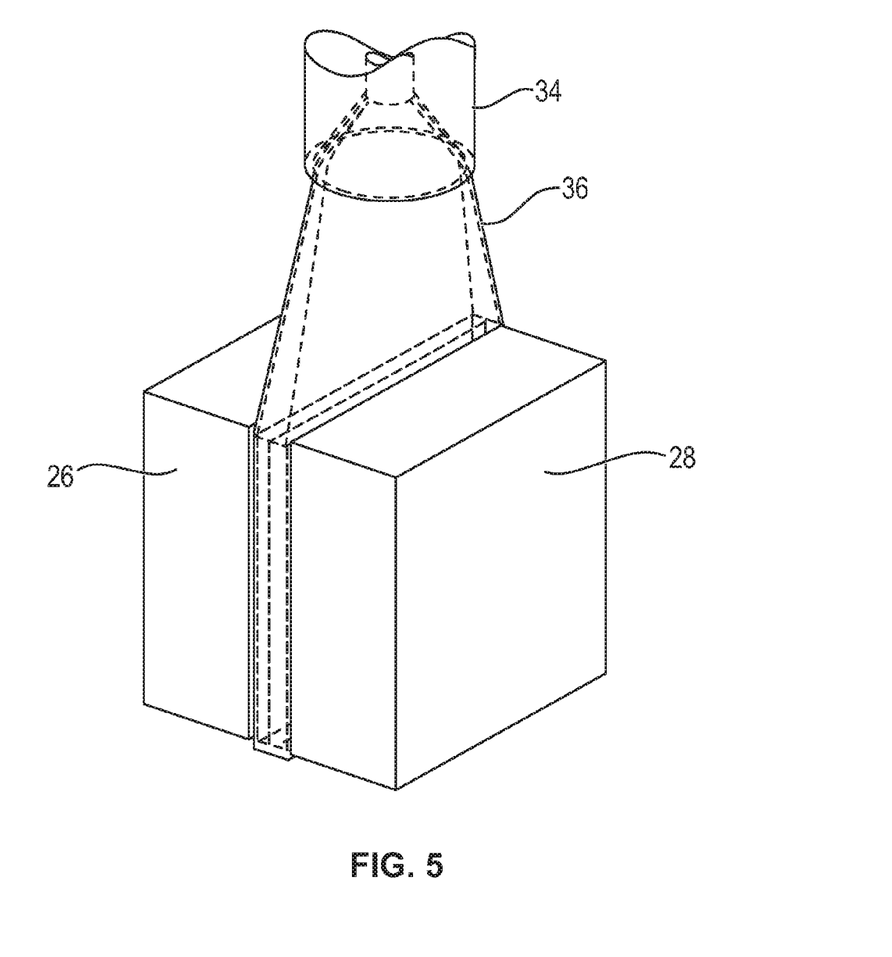
FIG. 5 shows an illustration with closed blow molds.

In FIG. 5, the blow molds 26, 28 are closed, wherein the mold elements 35 of the mold frame 32 form the flange 14, 16 at the edge of the respective blow mold 26, 28 and thus at the outer edge of the container shells 10, 12 to be formed on each side of the blow mold 26, 28 by pressing between the respective blow mold 26, 28. By blowing air into the mold frame 32, the respective container shell 10, 12 is formed in the cavities 30 of the blow molds 26, 28.

Figure 6:
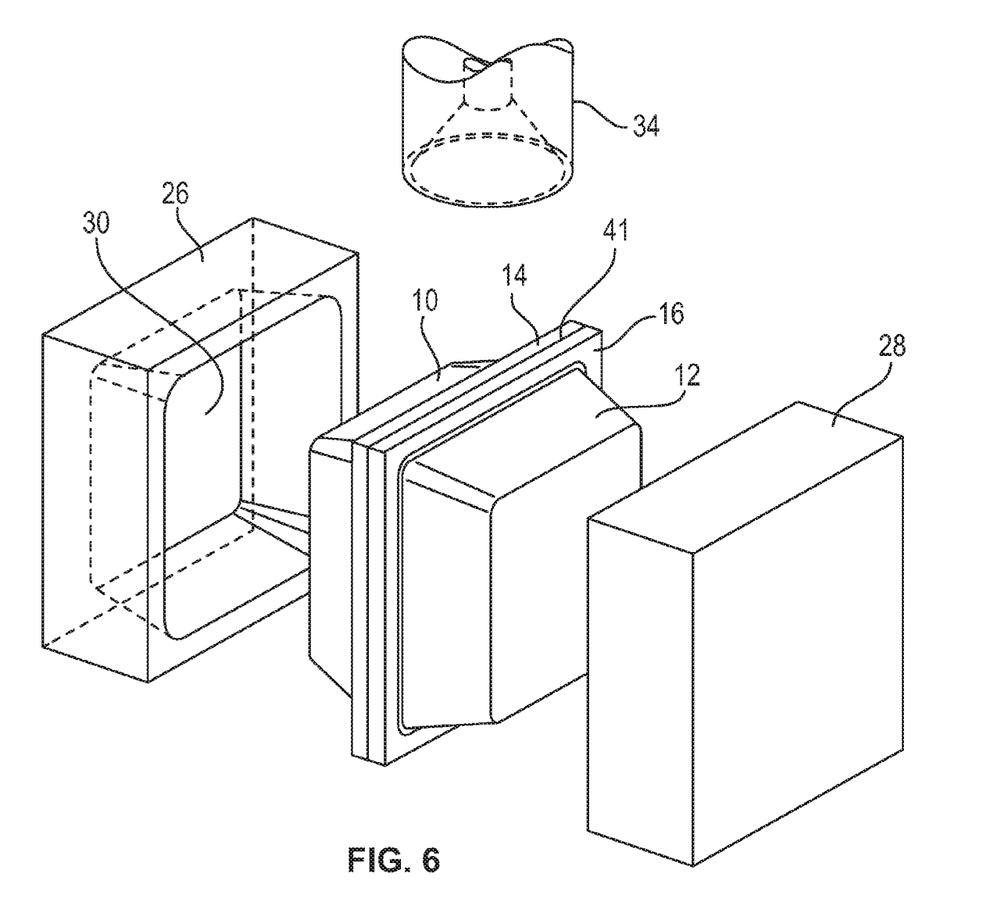
FIG. 6 shows the state after cooling the plastic molding material and open blow molds.

FIG. 6 shows a state after cooling down the plastic molding material in the blow molds 26, 28. The two container shells 10, 12 are cut free along a line 41 from the mold frame 32 surrounded by plastic material, and the containers 10, 12 with a respective circumferential flange 14, 16 are removed from the blow molding machine.

Figure 7:
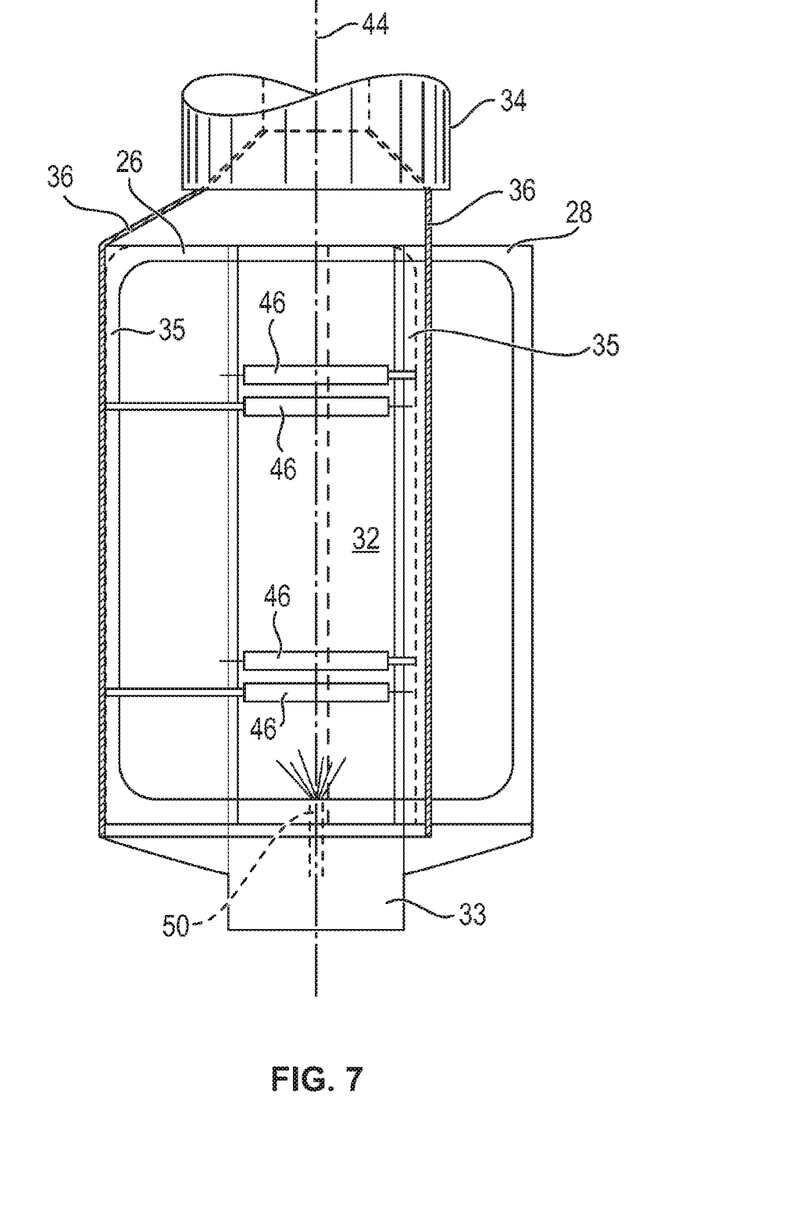
FIG. 7 shows a view of the mold frame in the closed and in the open state.

FIG. 7 shows a view of the mold frame 32 in two states. To the right of a center axis 44, the mold frame 32 with associated mold element 35 is illustrated in the retracted state in which the preform 36 is passed downward so as to surround the mold frame 32. To the left of the center axis 44, the mold frame 32 is in the extended state, wherein it spreads the tube-shaped preform 36 outwards. Within the mold frame 32, four hydraulic or electric linear drives 46 are arranged which move the mold elements 35 of the mold frame 32 into the extended or the retracted state. At the lower end of the mold frame 32, a blowing air supply 50 is provided, via which the blowing air for blow molding can be blown in. As can be seen, the preform 36 extends beyond the lower edge of the mold frame 32 to have enough plastic material present in the closed state of the blow molds 26, 28 in order to form the circumferential flanges 14, 16.

Figure 8:
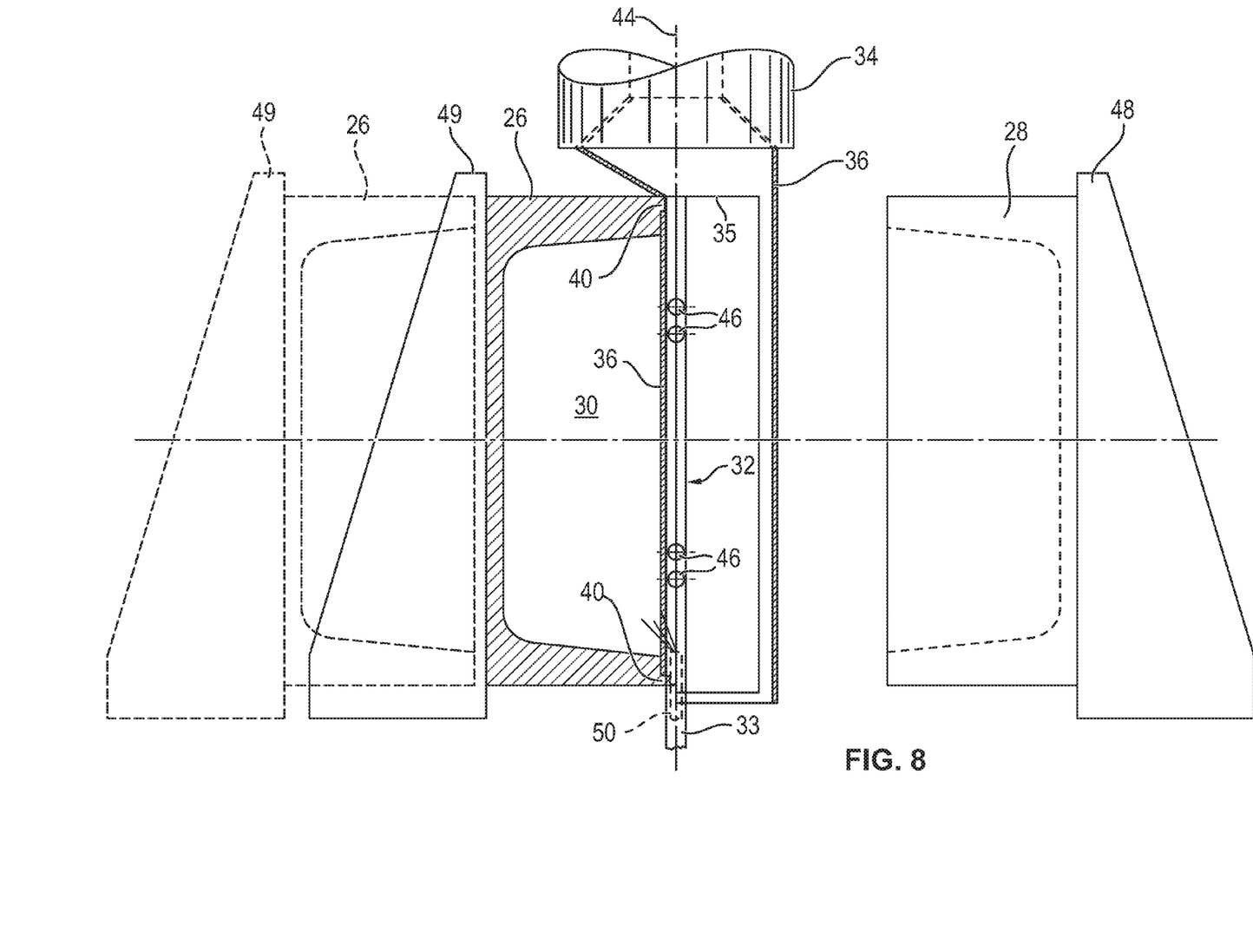
FIG. 8 shows a side view of the mold frame in the retracted and in the spread-out state.

FIG. 8 shows a side view of the mold frame 32. To the right of the center axis 44, a state is shown in which a closing element 48 keeps the blow mold 26 in the open state. The preform 36 is passed over the retracted mold frame 32. To the left of the center axis 44, a state can be seen in which a further closing element 49 has moved the associated blow mold 26 from an open position illustrated in broken lines into the closed position. The mold frame 32 is in the extended state and its mold elements 35 press the preform 36 against the edge portions 40 of the blow mold 26 in order to form the flange 16. Via the blowing air supply 50 blowing air is blown in and the wall of the preform 36 places itself against the inner side of the cavity 30 of the blow mold 26, as a result whereof the associated container shell 10 is formed. The mold frame 32 is held from below by a fixture 33.

Figure 9:
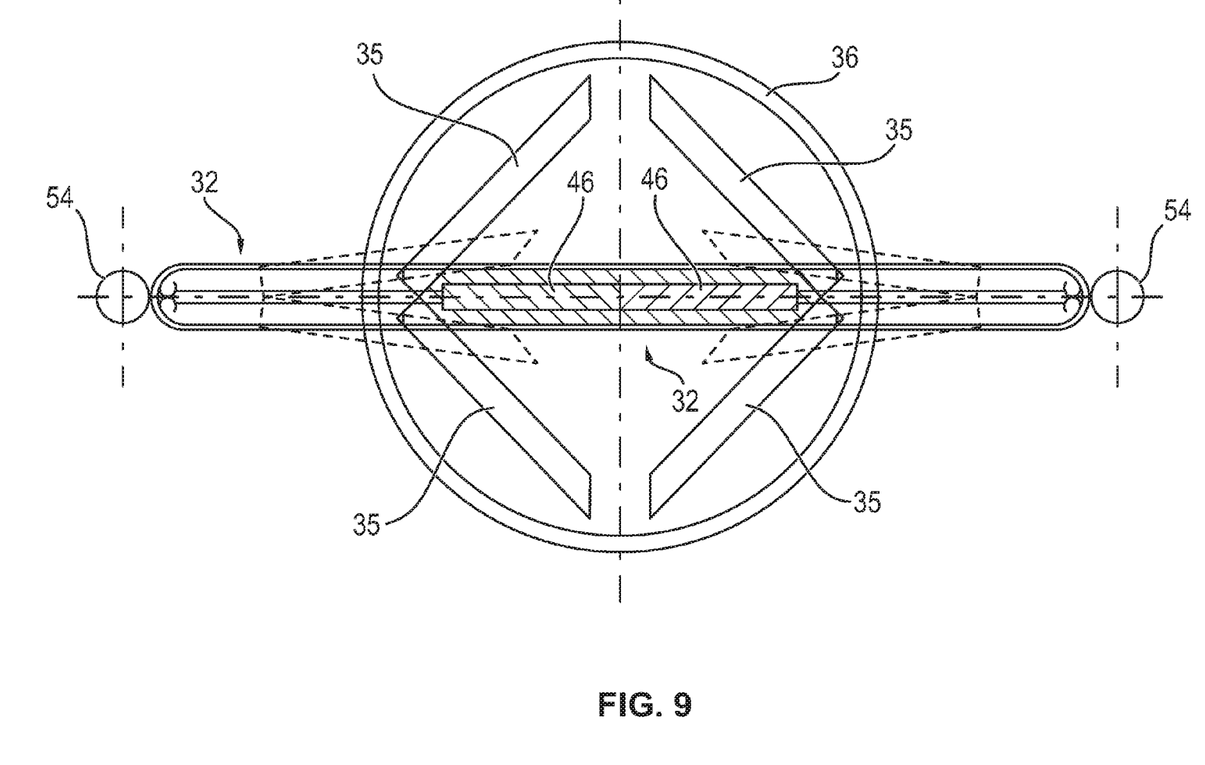
FIG. 9 shows a top view of the mold frame in the closed and the spread-out state.

FIG. 9 shows a top view of the mold frame 32. Two states of the mold frame 32 are illustrated. In one state, the mold frame 32 is in the retracted state, in which its mold elements 35 are arranged within the tube of the preform 36 ejected by the molten material head 34. In this state, the preform 36 is passed downward over the mold frame 32. Moreover, an extended state of the mold frame 32 is illustrated, in which the mold elements 35 are moved outward by means of the linear drives 46. In doing so, the mold elements 35 also move the wall of the preform 36 and spread the preform. After forming the container shells 10, 12 in the blow molds 26, 28 and the forming of the flanges 14, 16 on the outer portions of the mold elements 35, the container shells 10, 12 are cut free from the mold frame 32, for which a cutting device 54 with a rotating knife is arranged.

Figure 10:
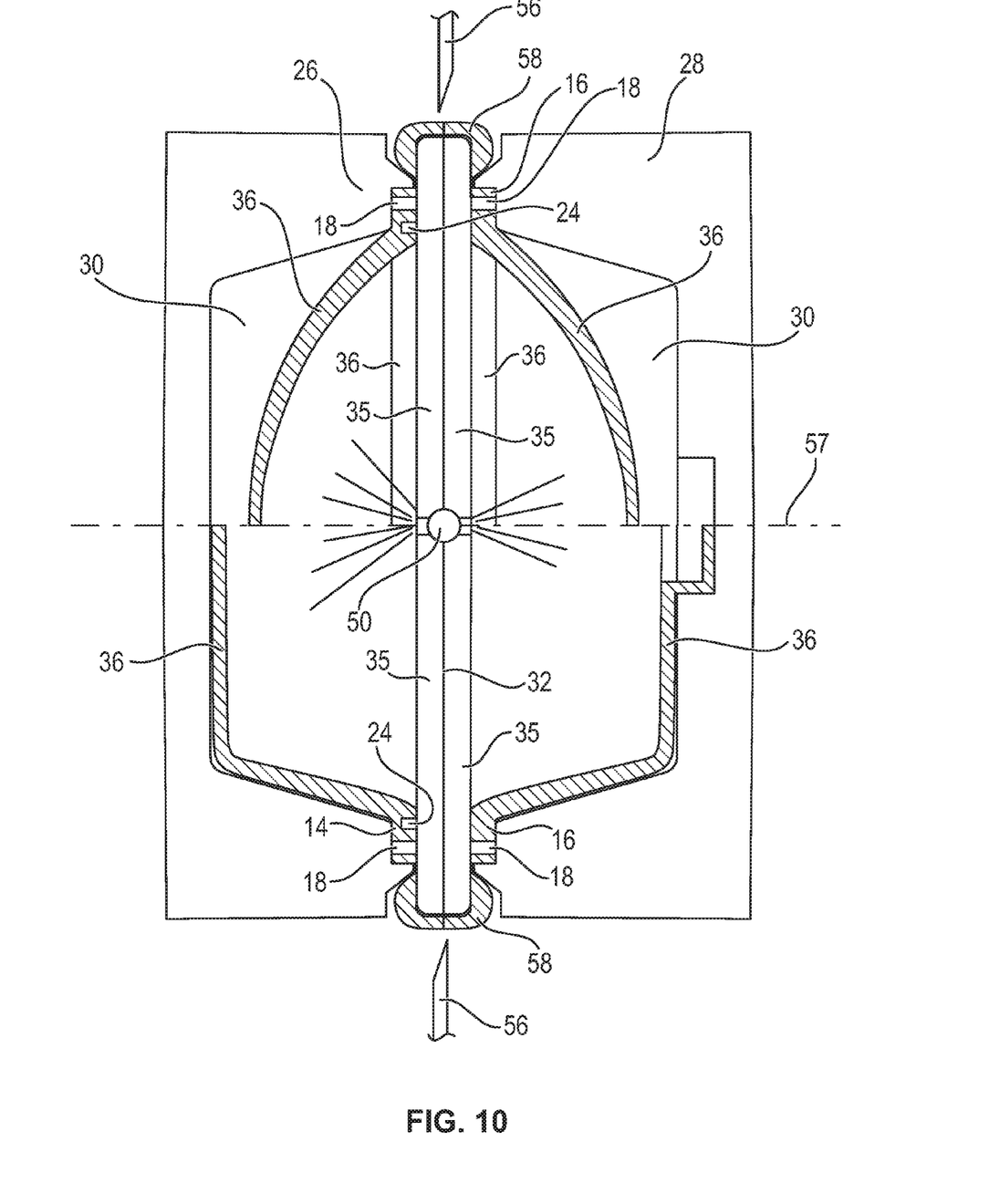
FIG. 10 shows a side view with different states of the blow molding process.

FIG. 10 shows a top view of two states above and below a center line 57. The blow molds 26, 28 are each in the closed position with the mold frame 32 arranged in the center. In the upper image part, it is shown that the blowing air fed via the blowing air supply 50 expands the preform 36 so that it is forced into the cavity 30 of the blow molds 26, 28. At the same time, a vacuum is applied to the cavities 30 of the blow molds 26, 28 in this embodiment, which vacuum supports the expansion of the preform 36 and the latter places itself against the inner wall of the cavities 30. In this example, the preform 36 is a multilayer preform and includes a foam structure as medium layer. For forming this foam structure, a reduced blow pressure is required, which is made possible by the application of the vacuum. In doing so, the preform 36 is circumferentially tightly pressed against the outer portions of the mold elements 35 of the mold frame 32 so that the vacuum can build up between the blow molds 26, 28 and the preform 36.

As can be seen, the blow molds 26, 28 are designed such that in the outer portion of the mold elements 35 a flash 58 results. Along this flash 58, the flash 58 is cut free circumferentially by means of the cutting device 54 and associated knives 56, this flash 58 being waste material. The blow molds 26, 28 are formed such at their edge portions that the circumferential flat flanges 14, 16 are formed with through holes 18.

Figure 11:
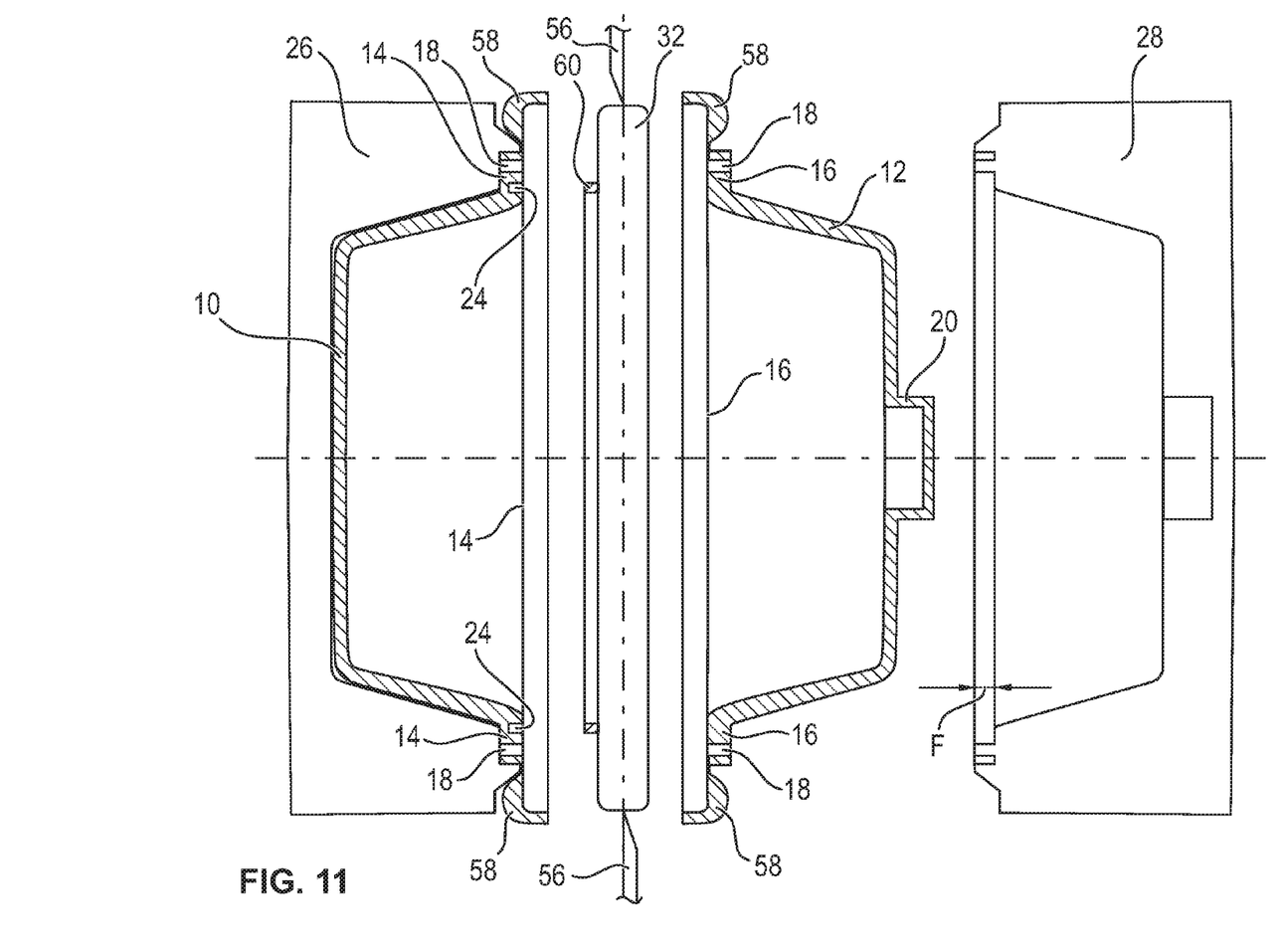
FIG. 11 shows a side view with partly open and fully open blow mold.

FIG. 11 shows a side view of two states. To the left of the center axis 44, the state with partly open blow mold 26 is illustrated. The container shell 10 is cut free from the mold frame 32. In the right-hand image part, the blow mold 28 is in the open final position and the container shell 12 can be removed and the parts of the flash 58 can be fed to the waste. By means of a circumferential groove molding element 60 on the mold frame 32 the circumferential groove 24 for the later reception of a seal is formed in the flange 14. The flanges 14, 16 are formed by pressing between the outer portions of the mold frame 32 and the edge portions 40 of the blow molds 26, 28. A flange measure F in the blow molds 26, 28 is at least 20% smaller than the thickness of the preform 36.

The described method and the device can be modified in many ways. The mold elements 35 can be designed foldable or movable by means of drives. It is advantageous when the mold elements form a flat surface in the spread-out state. It is also advantageous when in the case of several blow molds in one blow molding machine the respective hollow body molds are designed differently. Further, it is advantageous when after cutting the container shells free from the mold frame this mold frame is pulled downward or upward away from the blow molds before removing the container shells. When using a co-extrusion machine, the tube-shaped preform can also include several different plastic layers.

LIST OF REFERENCE SIGNS 10, 12 container shells
14, 16 flange
18 through holes
20 access opening
22 reinforcing elements
24 groove
26, 28 blow molds
30 cavity
32 mold frame
34 molten material head
36 preform
D inner diameter of the preform
d width of the mold volume
35 mold elements
41 line
44 center axis
46 linear drive
50 blowing air supply
48 closing element
49 further closing element
54 cutting device
56 knife
57 center line
58 flash
60 groove molding element
F flange measure

What is claimed is:

1. A method for producing a large-volume container having two container shells (10, 12) from plastic material wherein each shell has a capacity of 1,000 to 5,000 liters comprising the steps of:
  ejecting a tube-shaped preform (36) from a molten material head (34) of a blow molding machine in a still thermoplastic state, thereafter passing freely the tube-shaped preform (36) of plastic material in that thermoplastic state downward over a retracted mold frame (32) which faces two blow molds (26, 28) in the open state,
  extending the mold frame (32) in an extended, spread-out state forming a circumferential flange (14,16) at the edges of the respective blow mold (26, 28) and thus at the outer edges of the respective container shells (10, 12) formed therein;
  closing the two blow molds (26, 28) such that the container shells (10, 12) are formed in the two blow molds (26, 28) simultaneously by plastic blow molding;
  (a) wherein during the forming of the flange (14) on one of the two container shells (10, 12) a circumferential groove (24) is formed by means of a circumferential groove forming element (60) on the mold frame (32),
  (b) cooling the plastic material in the two blow molds (26, 28) and thereafter,
  (c) cutting the two container shells (10, 12) free from the mold frame (32) along a line (41) by means of a cutting device (54) having a circumferential blade, whereby two separate container shells (10, 12) are formed;
  (d) opening the two blow molds (26, 28) and taking the two open container shells (10, 12) out of the blow molds (26, 28) and thereafter,
  (e) transporting at least two open container shells (10, 12) each with a capacity of 1000 to 5,000 liters from their place of production to a point of destination and thereafter
  (f) connecting the two open container shells (10,12) at their circumferential flanges (14, 16) while inserting a seal (26) into the circumferential groove (24) to form the large volume container in a fluid tight manner.

2. A device for producing large-volume container shells (10, 12) from plastic material in which a molten material head (34) of a blow molding machine, a tube-shaped preform (36) of plastic material in a thermoplastic state, which is subsequentially passed freely downward over a retracted mold frame (32) which faces two blow molds (26, 28) in the open state, the two blow molds (26, 28) can be arranged in a closed fashion, wherein the mold frame (32) in an extended spread out state forms a circumferential flange (14, 16) at the edge of each of the blow molds (26, 28) and thus at the outer edge of the respective container shells (10, 12), whereby the two container shells (10, 12) being formable simultaneously in the two blow molds by plastic blow molding, wherein the mold frame (32) comprises a circumferential groove forming element (60) such that during the forming of the flange (14) of one container shell (10) of the two container shells (10, 12) also a circumferential groove (24) is formed by means of the circumferential groove forming element (60) on the mold frame (32) which groove is designed to receive a seal (26), and further in which after cooling of the plastic material in the two blow molds (26, 28), means are provided such that the two container shells (10, 12) can be cut free from the mold frame (32) along a line (41) by a cutting device (54) having a circumferential blade, whereby two separate open container shells (10, 12) are formed each with a capacity of 1,000 to 5,000 liters, which can be taken out of the opened blow molds (26, 28).

\* \* \* \* \*